United States Patent [19]

Klotz

[11] Patent Number: 5,584,470
[45] Date of Patent: Dec. 17, 1996

[54] METHOD AND APPARATUS FOR INJECTION MOLDING A HOLLOW-WALL CONTAINER

[75] Inventor: Bernd Klotz, Günding, Germany

[73] Assignee: Krauss-Maffei Aktiengesellschaft, Munich, Germany

[21] Appl. No.: 416,154

[22] Filed: Apr. 4, 1995

[30] Foreign Application Priority Data

Apr. 28, 1994 [DE] Germany ............ 44 14 889.5

[51] Int. Cl.⁶ ............................................ B29C 45/16
[52] U.S. Cl. .................. 264/572; 425/130; 425/562; 425/DIG. 58
[58] Field of Search ............. 264/572; 425/130, 425/562, DIG. 58

[56] References Cited

U.S. PATENT DOCUMENTS

| | | | |
|---|---|---|---|
| 4,990,083 | 2/1991 | Bernhardt | 425/562 |
| 5,254,306 | 10/1993 | Inada | . |
| 5,397,226 | 3/1995 | Vandenberg | 425/DIG. 58 |

FOREIGN PATENT DOCUMENTS

| | | |
|---|---|---|
| 0363948 | 4/1990 | European Pat. Off. . |
| 4002503 | 5/1991 | Germany . |
| 5245867 | 9/1993 | Japan . |
| 8903105 | 7/1991 | Netherlands . |

OTHER PUBLICATIONS

*Kunststoffe*, voly 79, No. 11, Nov. 1, 1989 "Neue Möglichkeiten beim Spritzgiessen durch das Gasinnendruckverfahren" by B. Klotz & E. Bürkle.

Primary Examiner—Tim Heitbrink
Attorney, Agent, or Firm—Herbert Dubno; Andrew Wilford

[57] ABSTRACT

An injection-molding apparatus for making a hollow-wall container having sides and a base has front and rear mold parts together forming side surfaces of a mold cavity centered on an axis and a floor mold part defining a base surface of the mold cavity. An inner core sleeve and an outer core sleeve are axially displaceable relative to each other and to the mold parts and have front ends. The sleeves together form a passage extending to the front ends and the front ends form a compartment. A sleeve actuator can displace the sleeves axially between a front position with the front ends of the sleeves projecting relatively far into the cavity and a rear position with the front ends of the sleeves generally retracted from the cavity. A piston/cylinder unit formed between the sleeves connected to the passage is pressurizable to shift the sleeves relative to each other and thereby open up the compartment into the cavity. A floor actuator can axially shift the floor between front and rear positions.

5 Claims, 2 Drawing Sheets

METHOD AND APPARATUS FOR INJECTION MOLDING A HOLLOW-WALL CONTAINER

FIELD OF THE INVENTION

The present invention relates to a hollow-wall container. More particularly this invention concerns a method of and apparatus for injection molding a hollow-wall container.

BACKGROUND OF THE INVENTION

In order to make a hollow-wall container, for instance for marketing yoghurt or the like, it is standard as described in German patent 4,002,503 filed 29 January 1990 by H. Strunk to use a mold that has two or three parts that define a die cavity and that also has a core element that is advanced into the die cavity and that is only retracted when the resin has substantially cured after the shot. The result is a hollow formed in the molded article that provides structural rigidity, makes the package look bigger than it really is, and that even offers some thermal insulation.

The disadvantage of this system is that it is normally necessary for sanitary or other reasons to cover the mouth of the hollow formed by the retracted core element. Thus in a separate step a separately cast piece is fitted over the mouth of this hollow. Clearly this extra step increases production costs.

OBJECTS OF THE INVENTION

It is therefore an object of the present invention to provide an improved injection-molding system for making a hollow-wall body.

Another object is the provision of such an improved injection-molding system for making a hollow-wall body which overcomes the above-given disadvantages, that is which allows the wall of the body to be formed with an internal hollow that is wholly closed off from the outside and that is formed in a single molding process.

SUMMARY OF THE INVENTION

An injection molding apparatus for making a hollow-wall container having sides and a base has according to the invention front and rear mold parts together forming side surfaces of a mold cavity centered on an axis and a floor mold part defining a base surface of the mold cavity. An inner core sleeve and an outer core sleeve are axially displaceable relative to each other and to the mold parts and have front ends. The sleeves together form a passage extending to the front ends and the front ends form a compartment. A sleeve actuator can displace the sleeves axially between a front position with the front ends of the sleeves projecting relatively far into the cavity and a rear position with the front ends of the sleeves generally retracted from the cavity. A piston/cylinder unit formed between the sleeves connected to the passage is pressurizable to shift the sleeves relative to each other and thereby open up the compartment into the cavity. A floor actuator can axially shift the floor between front and rear positions.

According to the invention the sleeves and floor part are coaxial and telescope in one another. In addition one of the sleeves is formed at its front end with a circumferential groove opening toward the other sleeve and forming the compartment. This groove is spaced from the front end by a distance that is shorter than a distance through which the sleeves are displaced relative to each other by the piston/cylinder unit.

This apparatus is operated by first injecting a molten resin into the cavity with the floor mold part in its rear position and the sleeves in the front position and then partially curing the resin in the cavity. The sleeves are then displaced into the rear position and the piston/cylinder unit is pneumatically pressurized to open the compartment into the cavity, form a void space in the cavity, and fill this space with gas under pressure. The resin in the cavity is cured some more and pressure is vented from the space. Finally the floor part is moved into its front position to displace resin in the cavity to close off the space.

With such an arrangement it is therefore possible to form a wholly closed space in the wall of a container in a single multistep molding operation. The resultant container will be very strong and still produced at the same unit cost of much simpler containers without hollow walls.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
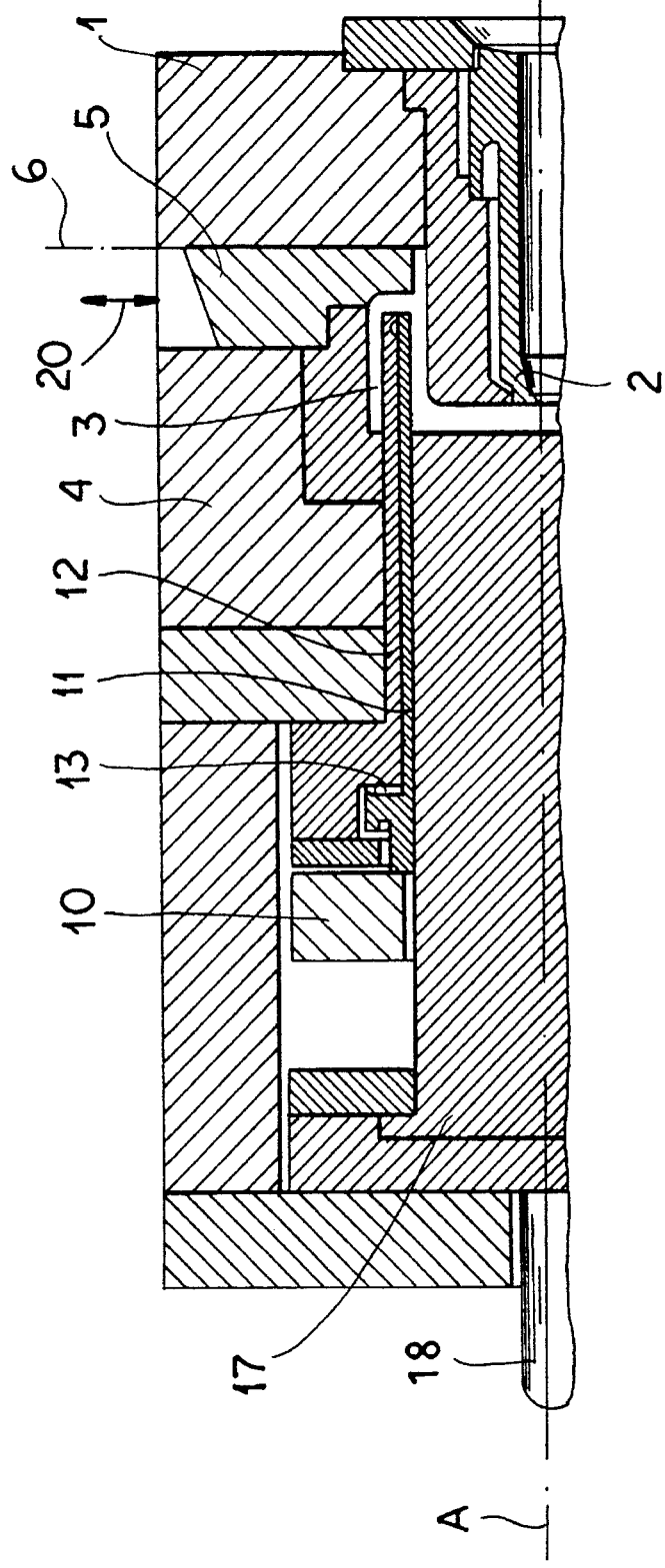
FIG. 1 is an axial section through the injection-molding apparatus according to this invention.
Figure 2:
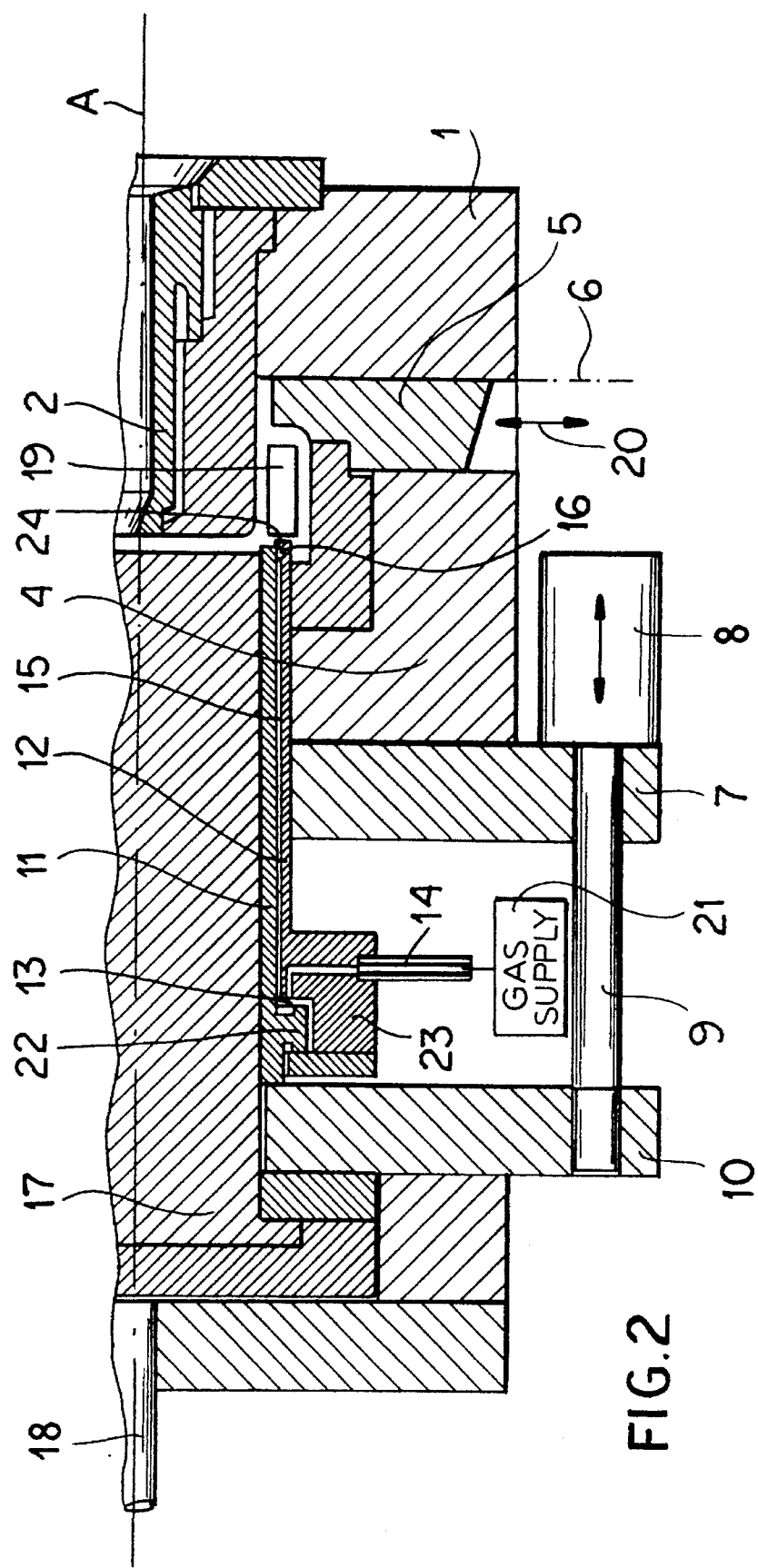
FIG. 2 is a view like FIG. 1 but showing the apparatus in another position and with some corollary equipment shown diagrammatically.

As seen in FIGS. 1 and 2 the injection-molding apparatus according to this invention has a front mold part or plate 1 centrally traversed along an axis A by an injection-molding nozzle 2. A separable middle mold part 5 lies against the plate 1 on a parting plane 6 and can split and be moved transversely as indicated by arrows 20. A rear mold plate or part 4 defines with the parts 1 and 5 a generally cup-shaped mold cavity 3 that is rotation-symmetrical and centered on the axis A. The floor of this cavity 3 is defined by the perpendicular front face of an axially movable floor part 17 also centered on the axis A and carried on a piston rod 18 of an unillustrated heavy-duty actuator.

An inner sleeve 11 and an outer sleeve 12 limitedly axially shiftable relative to each other and to the floor part 17 that they are carried on have front ends that can extend into the cavity 3 as shown in FIG. 1. The inner sleeve 11 is fixed to a plate 10 carried on rods 9 of hydraulic actuators 8 in turn carried on a plate 7 fixed to the plate 4. The sleeves 11 and 12 have on their rear ends radially outwardly projecting rims or flanges 22 and 23 that have respective confronting front and rear faces that define an annular compartment 13 that is connected to an axially extending space 15 between the sleeves 11 and 12 and to a conduit 14 itself connected to a supply 21 of gas, normally air. The supply 21 can furnish gas under pressure via the conduit 14 to the compartment 13 and space 15 or can allow gas in this space to vent. The outer sleeve 12 is formed immediately rearward of its front end with a radially inwardly open groove 16 (See also FIG. 3.) and the sleeves 11 and 12 can move axially relative to each other through an axial stroke S equal to more than the spacing between the groove 16 and a front-end surface of the sleeve 12.

To make a hollow-wall cup-shaped container the parts of the mold are set in the position of FIG. 1 with the core element formed by the two sleeves 11 and 12 advanced well into the cavity and the two front end faces of the sleeves 11 and 12 coplanar. The extruder nozzle 2 injects resin into the cavity 3 with the parts in this position, completely filling the cavity 3.

Figure 3:
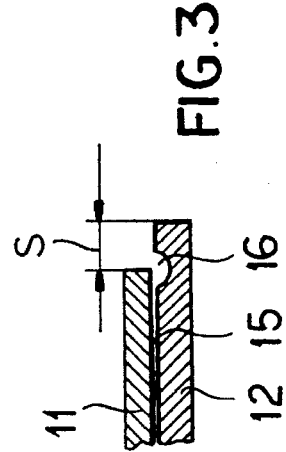
FIG. 3 is a large-scale view of a detail of FIG. 2.

After a short interval as shown in FIG. 2 the actuators 8 push back the plate 10 and thereby move the core element 11, 12 back out of the cavity 3 to form therein an annular void 19. Meanwhile the supply 21 is blowing air into the chamber 13 and through the spaces 15 and 16 into this void 19 to prevent it from collapsing and to make up the volume lost to shrinkage. In addition the pressure in the compartment 13 will shift the inner sleeve 11 back relative to the outer sleeve 12 as indicated in FIG. 3 to expose the groove 16 and ensure good flow out of the space 15 into the space 19.

Once the resin is fairly dimensionally stable, that is solid enough to hold its shape but still not fully cured, the pressure in the space 19 is vented through the passage 15 and supply 21 and the floor part 17 is advanced slightly. This forms a recess in the base of the workpiece being formed in the cavity 3 by displacing resin into an area 24 at the ends of the core element 11, 12. This displaced resin seals off the space 19 so that it is closed to the outside.

The container, which is intended to hold creamy materials, therefore has a hollow outer wall with a completely closed space 19 that provides considerable rigidity and, if necessary, some thermal insulation. The finished container is demolded by pulling the parts of the middle plate 5 radially outward and moving the plates 1 and 4 axially apart. The middle plate 5 can be internally formed to produce screwthreads on the outside of the mouth of the container. Further advance of the floor element 17 will push the finished workpiece out of the mold plate 4.

I claim:

1. A method of making a hollow-wall container with an apparatus comprising:

front and rear mold parts together forming side surfaces of a mold cavity centered on an axis;

a floor mold part defining a base surface of the mold cavity;

an inner core sleeve and an outer core sleeve axially displaceable relative to each other and to the mold parts and each sleeve having a front end, the sleeves together forming a passage extending to the front ends and being displaceable between a front position with the front ends forming a compartment and projecting into the cavity and a rear position generally retracted from the cavity, one of the sleeves being displaceable relative to the other sleeve into an intermediate position in which the compartment is uncovered and opens into the cavity;

sleeve actuator means for displacing the sleeves axially between the front and rear positions;

means including a pair of facing surfaces of the sleeves forming a pressurizable chamber between the sleeves connected to the passage;

means for pressurizing the chamber to shift the one sleeve relative to the other sleeve into the intermediate position and thereby open up the compartment into the cavity; and floor actuator means for axially shifting the floor mold part between an advanced position reducing the volume of the cavity and a retracted position, the method comprising the steps of sequentially:

injecting a molten resin into the cavity with the floor mold part in the retracted position and the sleeves in the front position;

partially curing the resin in the cavity;

displacing the one sleeve relative to the other sleeve into the intermediate position to open the compartment into the cavity and form a void space in the cavity;

injecting a fluid through the chamber into the void space to fill the void space with gas under pressure;

displacing the sleeves into the rear position;

further curing the resin in the cavity;

venting pressure from the space; and displacing the floor part into the advanced position and thereby displacing resin in the cavity to close off the space.

2. An injection molding apparatus for making a hollow-wall container having sides and a base, the apparatus comprising:

front and rear mold parts together forming side surfaces of a mold cavity centered on an axis;

a floor mold part defining a base surface of the mold cavity;

an inner core sleeve and an outer core sleeve axially displaceable relative to each other and to the mold parts and each having a front end, the sleeves together forming a passage extending to the front ends and being displaceable between a front position with the front ends forming a compartment and projecting into the cavity and a rear position generally retracted from the cavity, one of the sleeves being displaceable relative to the other sleeve into an intermediate position in which the compartment is uncovered and opens into the cavity;

sleeve actuator means for displacing the sleeves axially between the front and rear positions;

means including a pair of facing surfaces of the sleeves forming a pressurizable chamber between the sleeves connected to the passage;

means for pressurizing the chamber to shift the one sleeve relative to the other sleeve into the intermediate position and thereby open up the compartment into the cavity;

means including a nozzle for introducing molten plastic into the cavity;

means for injecting a fluid through the chamber into the cavity in the intermediate position of the one sleeve and thereby forming a fluid-filled pocket in the plastic in the cavity; and floor actuator means for axially shifting the floor mold part between an advanced position reducing the volume of the cavity and a retracted position.

3. The injection-molding apparatus defined in claim 2 wherein the sleeves and floor part are coaxial and telescopically movable.

4. The injection-molding apparatus defined in claim 2 wherein the front end of the one sleeve is formed with a circumferential groove opening toward the other sleeve and forming the compartment.

5. The injection-molding apparatus defined in claim 4 wherein the groove is spaced from the front end of the one sleeve by a distance that is shorter than a distance through which the sleeves are displaced relative to each other on displacement of the one sleeve relative to the other sleeve into the intermediate position.

\* \* \* \* \*